United States Patent [19]

Drake et al.

[11] Patent Number: 6,063,299

[45] Date of Patent: May 16, 2000

[54] MANUFACTURE OF A SILICON WAVEGUIDE STRUCTURE

[75] Inventors: John Paul Drake, Lambourn; Matthew Peter Shaw, Oxford, both of United Kingdom

[73] Assignee: Bookham Technology Limited, United Kingdom

[21] Appl. No.: 09/229,424

[22] Filed: Jan. 13, 1999

[30] Foreign Application Priority Data

Oct. 23, 1998 [GB] United Kingdom .................... 9823313

[51] Int. Cl.⁷ .............................. B44C 1/22; H01L 21/00
[52] U.S. Cl. .................................. 216/24; 216/2; 438/689
[58] Field of Search .......................... 216/2, 24; 438/719, 438/724, 753, 735, 744, 757

[56] References Cited

U.S. PATENT DOCUMENTS

| | | | |
|---|---|---|---|
| 4,787,691 | 11/1988 | Lorenzo et al. | 350/96.14 |
| 4,929,302 | 5/1990 | Valette | 216/24 X |
| 5,143,577 | 9/1992 | Haas et al. | |

FOREIGN PATENT DOCUMENTS

| | | |
|---|---|---|
| 2318647 | 4/1998 | United Kingdom . |
| 9508787 | 3/1995 | WIPO . |

OTHER PUBLICATIONS

Margail, J. et al., entitled "Reduced Defect Density in Silicon–on–Insulator Structures Formed by Oxygen Implantation in Two Steps", Appl. Phys. Lett., vol. 54, No. 56, pp. 526–528. Feb. 6, 1989.

Schmidtchen, J., et al., entitled "Low Loss Singlemode Optical Waveguides with Large Cross–Section in Silicon–On–Insulator", Electronics Letters, vol. 27, No. 16, pp. 1486–1488, Aug. 1, 1991.

*Primary Examiner*—William Powell
*Attorney, Agent, or Firm*—Webb Ziesenheim Logsdon Orkin & Hanson, P.C.

[57] ABSTRACT

A process for making a silicon rib wavegide structure is described comporising the following steps:

(i) forming a window in a protective layer on the surface of a silicon wafer to expose a part of said surface;

(ii) depositing a buffer layer at least over said exposed surface;

(iii) carrying out an etch step to etch the buffer layer and silicon outside a protected rib portion thereby to form a silicon rib with the buffer layer on its upper surface; and (iv) forming a layer of cladding at least on side walls of the silicon rib.

9 Claims, 3 Drawing Sheets

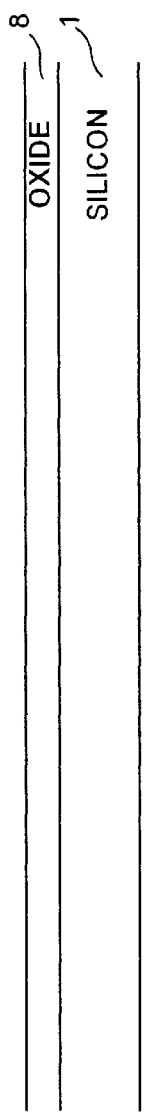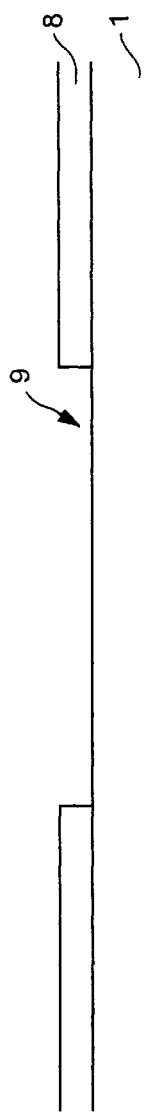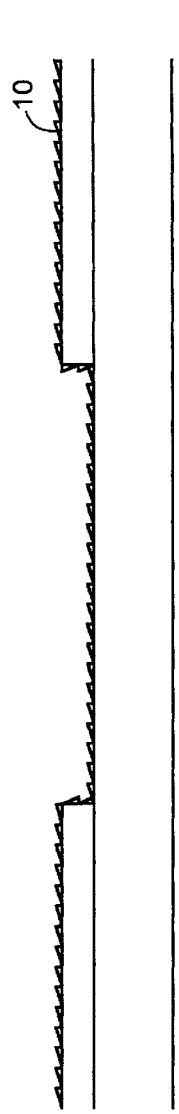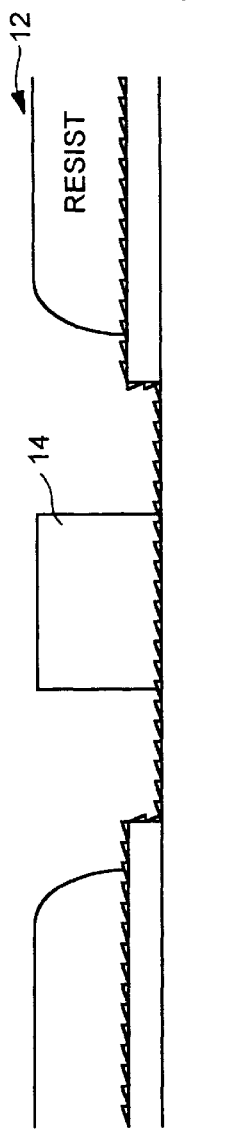

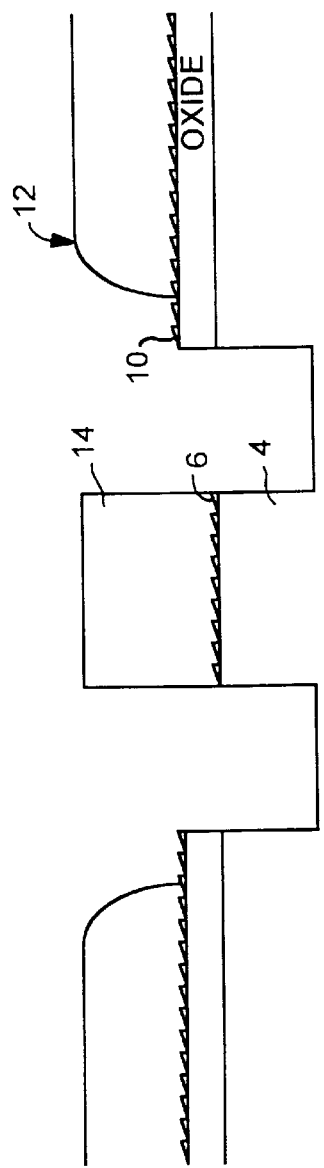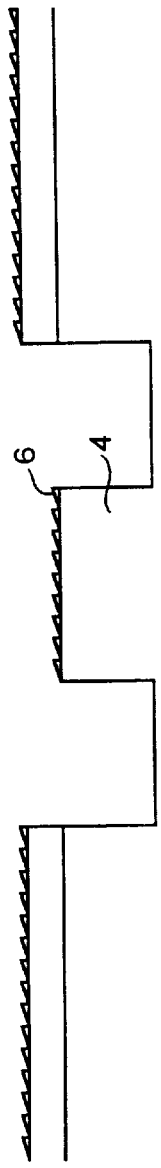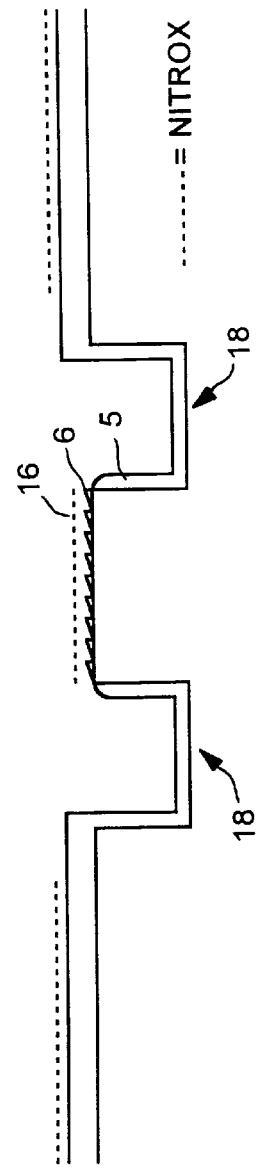

MANUFACTURE OF A SILICON WAVEGUIDE STRUCTURE

FIELD OF THE INVENTION

The present invention relates to manufacture of a silicon waveguide structure.

BACKGROUND TO THE INVENTION

In integrated optical circuits, a silicon waveguide structure typically comprises a rib formed in the upper epitaxial silicon layer of a silicon-on-insulator chip. The rib has a top surface and side walls, and has trough portions on either side of it. The rib serves to confine an optical transmission mode for light which is contained in the rib and under the trough portions.

It is often desirable to modify the basic waveguide structure to perform a number of different functions. During these modifications, it is frequently required to treat the top surface of the rib in a manner differently to that of the side walls.

SUMMARY OF THE INVENTION

It is an aim of the present invention to provide a process for making a silicon waveguide structure which permits these modifications to be carried out in an accurately controlled fashion. Therefore it is important that however the top and side walls are individually protected, this is done in a well-aligned fashion.

According to one aspect of the invention there is provided a process for making a silicon rib waveguide structure comprising:

forming a window in a protective layer on the surface of a silicon wafer to expose a part of said surface;

depositing a buffer layer at least over said exposed surface;

carrying out an etch step to etch the buffer layer and silicon outside a protected rib portion thereby to form a silicon rib with the buffer layer on its upper surface; and forming a layer of cladding at least on side walls of the silicon rib.

Preferred and optional features of the invention will be apparent from the subsidiary claims of the specification.

For a better understanding of the present invention and to show how the same may be carried into effect, reference will now be made by way of example to the accompanying drawings in which:

BRIEF DESCRIPTION OF THE DRAWINGS

FIGS. 3a, 3b, 3c, 3d, 3e, 3f, and 3g are steps in a process for forming a waveguide structure.

DESCRIPTION OF THE PREFERRED EMBODIMENT

Figure 1:
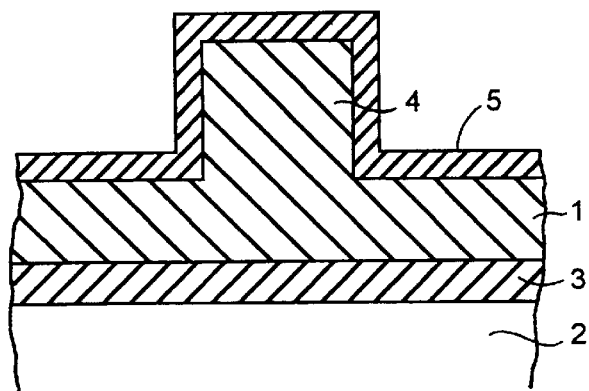
FIG. 1 is a cross-sectional view of a known rib waveguide formed in a silicon-on-insulator chip.

The rib waveguide described herein is based on a silicon-on-insulator chip. A process for forming this type of chip is described in a paper entitled "Reduced defect density in silicon-on-insulator structures formed by oxygen implantation in two steps" by J. Morgail et al, Applied Physics Letters, 54, page 526, 1989. This describes a process for making silicon-on-insulator wafer. The silicon layer of such a wafer is then increased, for example by epitaxial growth, to make it suitable for forming the basis of the integrated waveguide structure described herein. FIG. 1 shows a cross-section of an optical waveguide formed on such a chip. The chip comprises a layer of silicon 1 which is separated from the silicon substrate 2 by a layer of silicon dioxide 3. The rib waveguide 4 is formed in the silicon layer 1. FIG. 1 also shows an oxide cladding 5 formed over the rib waveguide 4. Further details of this form of waveguide are given in a paper entitled "Low loss single mode optical waveguides with large cross-section in silicon-on-insulator" by J. Schmidtchen et al in Electronic Letters, 27, page 1486, 1991 and in PCT Patent Specification No. WO95/08787.

This form of waveguide provides a single mode, low loss (typically less than 0.2 dB/cm for the wavelength range 1.2 to 1.6 microns) waveguide typically having dimensions in the order of 3 to 5 microns which can be coupled to optical fibres and which is compatible with other integrated components. This form of waveguide can also be easily fabricated from conventional silicon-on-insulator wafers (as described in WO95/08787 referred to above) and so is relatively inexpensive to manufacture.

Figure 2:
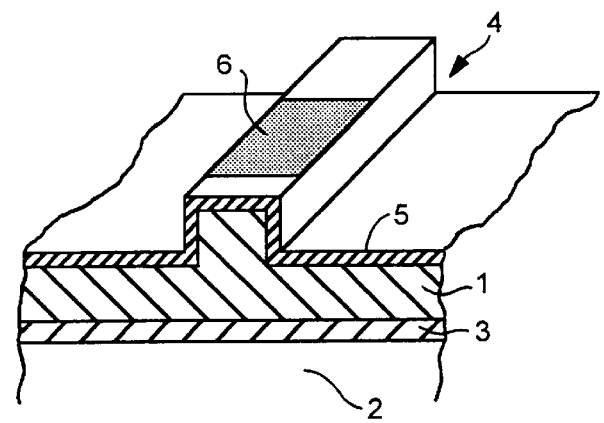
FIG. 2 is a perspective view of a waveguide structure.

FIG. 2 shows a perspective view of such a rib waveguide which has formed on a part of its upper surface a buffer layer 6. The buffer layer 6 typically has a length of 3 mm or less or preferably 1 mm or less.

As will become clearer in the following, the buffer layer has a number of different possible functions, in particular because the process described herein ensures that the edges of the buffer layer 6 are self-aligned with the top of the rib waveguide 4. This allows the cladding layer 5 to protect the side walls of the rib 4 while the buffer layer 6 protects its top surface. This allows for example the manufacture of a polariser by depositing a light absorbing layer on top of the buffer layer 6 but not on the side walls of the rib 4.

Moreover, if the buffer layer and the cladding layer have different etch characteristics, it allows the top surface of the rib 4 to be exposed while the side surfaces remain protected, or vice versa to allow selective introduction of dopants either into the top of the waveguide or through its sides. This can be done for example to control the refractive index of portions of the waveguide.

A process for making the rib waveguide of FIG. 2 will now be described with reference to FIG. 3.

FIG. 3a shows the upper surface of a silicon-on-insulator chip, and in particular shows the silicon layer 1. A protective layer of oxide 8 having a thickness of about 7000 Å is formed on the top of the silicon layer 1. Using a mask (not shown), a window 9 is etched through the oxide layer 8 to expose the surface of the silicon layer 1 (FIG. 3b). A thin buffer layer 10 is then deposited. The buffer layer is of nitride and is deposited using an LPCVD (low pressure chemical vapour deposition) process. For example, the thickness of the buffer layer may be around 170 Å (see FIG. 3c).

Then, according to FIG. 3d, a pattern of photoresist 12 is deposited. Of importance, a central part 14 of the photoresist defines the area where the rib waveguide 4 is to be formed.

Then, an etch step is carried out to etch through the buffer layer 10 and into the silicon layer 1 to define the rib 4. This can be done as a single etch step using a known dry etch process, or as a two step etch process. This is illustrated in FIG. 3e. The depth of the waveguide is for example 1.45 µm.

Then, according to FIG. 3f, the resist pattern 12 is removed to have the effect of leaving a buffer layer 6 perfectly aligned with the side walls of the rib 4.

Finally, an oxidation step is performed to form the cladding layer 5. The thickness of the oxide layer forming the cladding layer 5 is about 0.35 μm. During the oxidation process, the nitride layer 6 on top of the rib 4 effectively inhibits oxidation on the top surface of the rib. Only a very thin oxide layer of about 40 Å will form. This is denoted 16.

Figure 4:
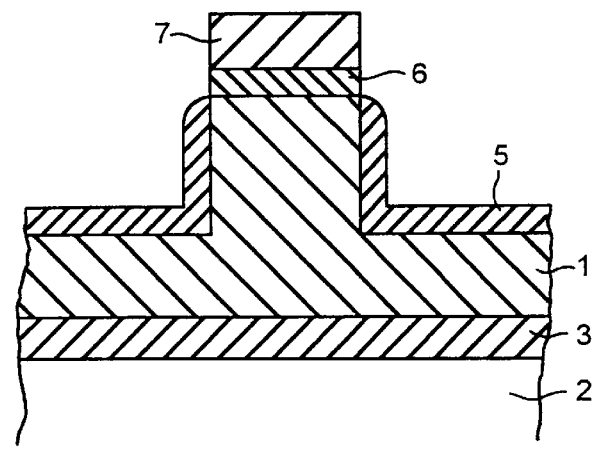
FIG. 4 is a cross-section through a polariser.

FIG. 4 is a cross-section through a polariser which has been formed using the rib waveguide structure made by the process described above. After the step illustrated in FIG. 3g, a short oxide etch is performed which removes the native oxide layer 16 above the buffer layer 6, but still retains a significant thickness of the cladding layer 5. Then, a light absorbing layer 7 is deposited on top of the buffer layer 6. The alignment of this layer 7 is less important because the sides of the rib are protected by the silicon dioxide. The light absorbing layer 7 is preferably a metallic layer, for example aluminium. The metallic layer 7 causes attenuation of the light received from the waveguide. More details concerning operation of a polariser of this type are given in our British Patent Application No. 9718346.1.

Another use of the structure illustrated in FIG. 3g is to allow selective introduction of dopant into the rib waveguide structure. For example, if dopants are required to be introduced through the side walls or in the trough portions 18 on either side of the rib 4, then the cladding layer 5 can be etched away using an oxide etch, while the buffer layer 6 remains to protect the top surface of the rib 4. Conversely, if dopants are required to be introduced into the top surface of the rib but not into the side walls or trough portions 18, then a selective etchant can be used to etch away the nitride but leave the cladding layer 5 intact. Thus, the selective etch characteristics of the cladding layer and buffer layer allow a number of different doping possibilities.

As an alternative to the use of nitride for the buffer layer, a native oxide layer may be used. That is, during the step illustrated in FIG. 3c, an oxide growth step is performed to grow a thin oxide layer on the exposed surface of the silicon layer 1 in the window 9. Afterwards, the steps are the same as already described. It can be seen that the effect of this would be to have, in the structure of FIG. 3g, a slightly thicker oxide layer on the top portion of the rib as opposed to the cladding layer 5 on the side portions and trough portions. Once again however this allows for a selective etch characteristic, because for a given etch time, only a certain thickness of oxide will be removed. Therefore, it is possible to remove, for example, oxide from the side walls of the rib without removing all the oxide from the top portion.

If a native oxide layer is used, this may have, for example, a thickness of about 30 Å.

Therefore, overall the buffer layer may have a thickness in the range 20–500 Å and preferably in the range 80–220 Å. When considering the use of the buffer layer in a polariser, the thickness of the layer depends on the refractive index of the buffer layer.

By use of a buffer layer on the top of the rib, a pattern can be etched into the top of the rib without affecting the side walls.

What is claimed is:

1. A process for making a silicon rib waveguide structure comprising:

forming a window in a protective layer on the surface of a silicon wafer to expose a part of said surface;

depositing a buffer layer at least over said exposed surface;

carrying out an etch step to etch the buffer layer and silicon outside a protected rib portion thereby to form a silicon rib with the buffer layer on its upper surface; and forming a layer of cladding at least on side walls of the silicon rib.

2. A process according to claim 1, wherein the buffer layer comprises silicon nitride.

3. A process according to claim 2, wherein the buffer layer is deposited using an LPCVD process.

4. A process according to claim 1, wherein the buffer layer is a native oxide.

5. A process according to claim 1, wherein the thickness of the buffer layer is in the range 20–500 Å and preferably in the range 80–220 Å.

6. A process according to claim 1, which further comprises the step of forming a light absorbing layer on the buffer layer to define a polariser.

7. A process according to claim 1, wherein the step of forming a layer of cladding comprises carrying out an oxidation step such that a cladding layer of oxide is formed on the side walls of the silicon rib.

8. A process according to claim 1, wherein the cladding layer and the buffer layer have different etch characteristics.

9. A process according to claim 1, which further comprises selectively removing either the buffer layer from the top surface of the rib or the cladding layer from at least one of the side walls of the rib, and introducing dopants into the area from which the buffer layer or cladding layer respectively has been removed.

\* \* \* \* \*

UNITED STATES PATENT AND TRADEMARK OFFICE
CERTIFICATE OF CORRECTION

PATENT NO. : 6,063,299
DATED : May 16, 2000
INVENTOR(S) : John Paul Drake et al.

It is certified that error appears in the above-identified patent and that said Letters Patent is hereby corrected as shown below:

Column 4,
Line 33, after "20-500 Å" delete -- and preferably in the range 80-220 Å --.

Signed and Sealed this

Seventh Day of August, 2001

*Attest:*

*Attesting Officer*

NICHOLAS P. GODICI
*Acting Director of the United States Patent and Trademark Office*